United States Patent
Ling et al.

(10) Patent No.: US 9,813,146 B2
(45) Date of Patent: **\*Nov. 7, 2017**

(54) METHOD AND SYSTEM FOR MONITORING, MANAGEMENT AND MAINTENANCE OF AN INTERNET PROTOCOL LNB

(71) Applicants: Curtis Ling, Carlsbad, CA (US); Timothy Gallagher, Encinitas, CA (US); Glenn Chang, Carlsbad, CA (US)

(72) Inventors: Curtis Ling, Carlsbad, CA (US); Timothy Gallagher, Encinitas, CA (US); Glenn Chang, Carlsbad, CA (US)

(73) Assignee: MAXLINEAR, INC., Carlsbad, CA (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/687,676

(22) Filed: Nov. 28, 2012

(65) Prior Publication Data

US 2013/0205350 A1     Aug. 8, 2013

Related U.S. Application Data

(60) Provisional application No. 61/595,654, filed on Feb. 6, 2012.

(51) Int. Cl.
*H04N 21/61* (2011.01)
*H04N 21/63* (2011.01)
(Continued)

(52) U.S. Cl.
CPC .......... *H04B 7/18526* (2013.01); *G01S 19/42* (2013.01); *H04B 7/185* (2013.01);
(Continued)

(58) Field of Classification Search
CPC ........... H04N 21/6143; H04N 21/6175; H04N 21/61; H04N 21/6193; H04N 21/64322; H04H 60/82
(Continued)

(56) References Cited

U.S. PATENT DOCUMENTS 7,911,400 B2 * 3/2011 Kaplan et al. ................. 343/713
8,095,466 B2 * 1/2012 Kahn et al. ...................... 705/51
(Continued)

OTHER PUBLICATIONS

Int'l Search Report and Written Opinion for PCT/US13/24974 dated Apr. 19, 2013.

*Primary Examiner* — Pankaj Kumar
*Assistant Examiner* — Alazar Tilahun
(74) *Attorney, Agent, or Firm* — McAndrews, Held & Malloy, Ltd.

(57) ABSTRACT

An Internet protocol low noise block downconverter (IP LNB) assembly, which is within a satellite dish assembly, may be operable to determine one or more baseline settings of the satellite dish assembly. The IP LNB assembly may monitor, periodically or aperiodically, one or more current settings that may correspond to the determined one or more baseline settings to identify deviations of the one or more current settings from the baseline settings. The results of the monitoring may be communicated to a satellite service provider. The satellite service provider may provide maintenance and/or service management for the satellite dish assembly based on the communicated results of the monitoring. The IP LNB assembly may determine a location setting via a GNSS module and determine an alignment setting via a directional sensor in the IP LNB assembly. The IP LNB assembly may determine a received signal strength based on a RSSI.

20 Claims, 6 Drawing Sheets

(51) Int. Cl.
| | |
|---|---|
| H04B 7/185 | (2006.01) |
| H04W 84/10 | (2009.01) |
| H04H 40/90 | (2008.01) |
| H04N 21/45 | (2011.01) |
| H04H 20/08 | (2008.01) |
| H04N 21/643 | (2011.01) |
| H04W 4/02 | (2009.01) |
| H04N 21/41 | (2011.01) |
| H04N 21/4363 | (2011.01) |
| H04N 21/4405 | (2011.01) |
| H04N 21/434 | (2011.01) |
| H04N 21/438 | (2011.01) |
| H04N 21/4408 | (2011.01) |
| H04N 21/441 | (2011.01) |
| H04N 21/4627 | (2011.01) |
| H04J 4/00 | (2006.01) |
| H04W 76/04 | (2009.01) |
| H04L 12/741 | (2013.01) |
| H04L 29/12 | (2006.01) |
| H04W 84/04 | (2009.01) |
| H04W 88/08 | (2009.01) |
| H04W 88/16 | (2009.01) |
| G01S 19/42 | (2010.01) |
| H04L 29/06 | (2006.01) |
| H04H 60/21 | (2008.01) |
| H04H 60/23 | (2008.01) |
| H04W 84/12 | (2009.01) |

(52) U.S. Cl.
CPC ..... *H04B 7/18515* (2013.01); *H04B 7/18517* (2013.01); *H04B 7/18523* (2013.01); *H04H 20/08* (2013.01); *H04H 40/90* (2013.01); *H04J 4/00* (2013.01); *H04L 45/74* (2013.01); *H04L 61/2007* (2013.01); *H04L 65/4076* (2013.01); *H04N 21/4126* (2013.01); *H04N 21/4343* (2013.01); *H04N 21/4382* (2013.01); *H04N 21/43637* (2013.01); *H04N 21/441* (2013.01); *H04N 21/4405* (2013.01); *H04N 21/4408* (2013.01); *H04N 21/4524* (2013.01); *H04N 21/4627* (2013.01); *H04N 21/61* (2013.01); *H04N 21/6143* (2013.01); *H04N 21/6193* (2013.01); *H04N 21/64322* (2013.01); *H04W 4/023* (2013.01); *H04W 76/04* (2013.01); *H04W 84/042* (2013.01); *H04W 84/10* (2013.01); *H04W 88/08* (2013.01); *H04W 88/16* (2013.01); *H04H 60/21* (2013.01); *H04H 60/23* (2013.01); *H04W 84/12* (2013.01)

(58) Field of Classification Search
USPC .............................. 725/63–72; 370/315, 338
See application file for complete search history.

(56) References Cited

U.S. PATENT DOCUMENTS

| | | | |
|---|---|---|---|
| 8,108,900 | B2* | 1/2012 | Petruzzelli ...................... 725/68 |
| 2005/0055720 | A1* | 3/2005 | Atad et al. ...................... 725/68 |
| 2009/0081947 | A1* | 3/2009 | Margis .......................... 455/3.02 |
| 2011/0267229 | A1* | 11/2011 | Gayrard et al. .......... 342/357.31 |
| 2012/0163290 | A1* | 6/2012 | Krafft et al. ................... 370/316 |
| 2012/0297426 | A1 | 11/2012 | Ling et al. |

* cited by examiner

METHOD AND SYSTEM FOR MONITORING, MANAGEMENT AND MAINTENANCE OF AN INTERNET PROTOCOL LNB

CROSS-REFERENCE TO RELATED APPLICATIONS/INCORPORATION BY REFERENCE

This patent application makes reference to, claims priority to, and, claims benefit from U.S. Provisional Application Ser. No. 61/595,654, which was filed on Feb. 6, 2012.

This application also makes reference to:
U.S. patent application Ser. No. 13/326,125 filed on Dec. 14, 2011;
U.S. patent application Ser. No. 13/596,852 filed on Aug. 28, 2012;
U.S. patent application Ser. No. 13/715,250 filed on Dec. 14, 2012;
U.S. patent application Ser. No. 13/687,626 filed on Nov. 28, 2012; and
U.S. patent application Ser. No. 13/687,742 filed on Nov. 28, 2012.

Each of the above stated applications is hereby incorporated herein by reference in its entirety.

FIELD OF THE INVENTION

Certain embodiments of the invention relate to communication systems. More specifically, certain embodiments of the invention relate to a method and system for monitoring, management and maintenance of an Internet protocol LNB.

BACKGROUND OF THE INVENTION

A satellite television system may comprise a low noise block downconverter (LNB) which is generally co-located with a satellite dish in the satellite television system. The conventional LNB may be operable to amplify a received radio frequency (RF) satellite signal and convert such signal to lower frequencies such as, for example, intermediate frequencies (IF). Presently, satellite television systems have become ubiquitous, primarily due to reductions in the cost of satellite television reception technology. A plurality of satellite television systems may be in a neighborhood.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for monitoring, management and maintenance of an Internet protocol LNB, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for monitoring, management and maintenance of an Internet protocol LNB. In various embodiments of the invention, an Internet protocol low noise block downconverter (IP LNB) assembly, which is within a satellite dish assembly, may be operable to determine one or more baseline settings (e.g., pre-determined or calculated, original installation, previous service call, otherwise optimal, etc.) of the satellite dish assembly. The IP LNB assembly may be operable to monitor, periodically or aperiodically, one or more current settings that may correspond to the determined one or more baseline settings to identify deviations of the one or more current settings from the baseline settings. The results of the monitoring may then be communicated by the IP LNB assembly to a satellite service provider. The satellite service provider may then provide maintenance and/or service management for the satellite dish assembly based on the communicated results of the monitoring. In this regard, the one or more baseline settings may comprise a location setting, an alignment setting and/or a received signal strength. The IP LNB assembly may determine the location setting via a global navigation satellite system (GNSS) module in the IP LNB assembly, and determine the alignment setting via a directional sensor in the IP LNB assembly, for example. The IP LNB assembly may determine the received signal strength based on a received signal strength indication (RSSI).

In an exemplary embodiment of the invention, the IP LNB assembly may be operable to adjust the satellite dish assembly back to the baseline based on the results of the monitoring. In such instances, the adjustment may be controlled from the satellite service provider or autonomously by the IP LNB assembly. The satellite service provider may communicate, based on the results of the monitoring, adjustment information to a technician and/or a user for adjusting the satellite dish assembly back to the baseline. While the user or the technician is adjusting the satellite dish assembly, the IP LNB assembly may be operable to communicate information, which indicates a current location setting and/or a current alignment setting of the satellite dish assembly, to the user or the technician. In some instances, based on the determined location setting of the satellite dish assembly, the satellite service provider may determine scheduling and/or routing direction for the technician.

In an exemplary embodiment of the invention, based on the determined location setting of the satellite dish assembly along with other location settings associated with other satellite dish assemblies in a region, the satellite service provider may determine an amount of beam coverage and/or an amount of bandwidth that may be required for the region. Based on the determined location setting of the satellite dish assembly, the satellite service provider may also communicate or provide one or more targeted advertisements to a user. The satellite service provider may dynamically and/or adaptively adjust a power level of an associated satellite based on the monitoring of the received signal strength and/or environmental conditions.

Figure 1:
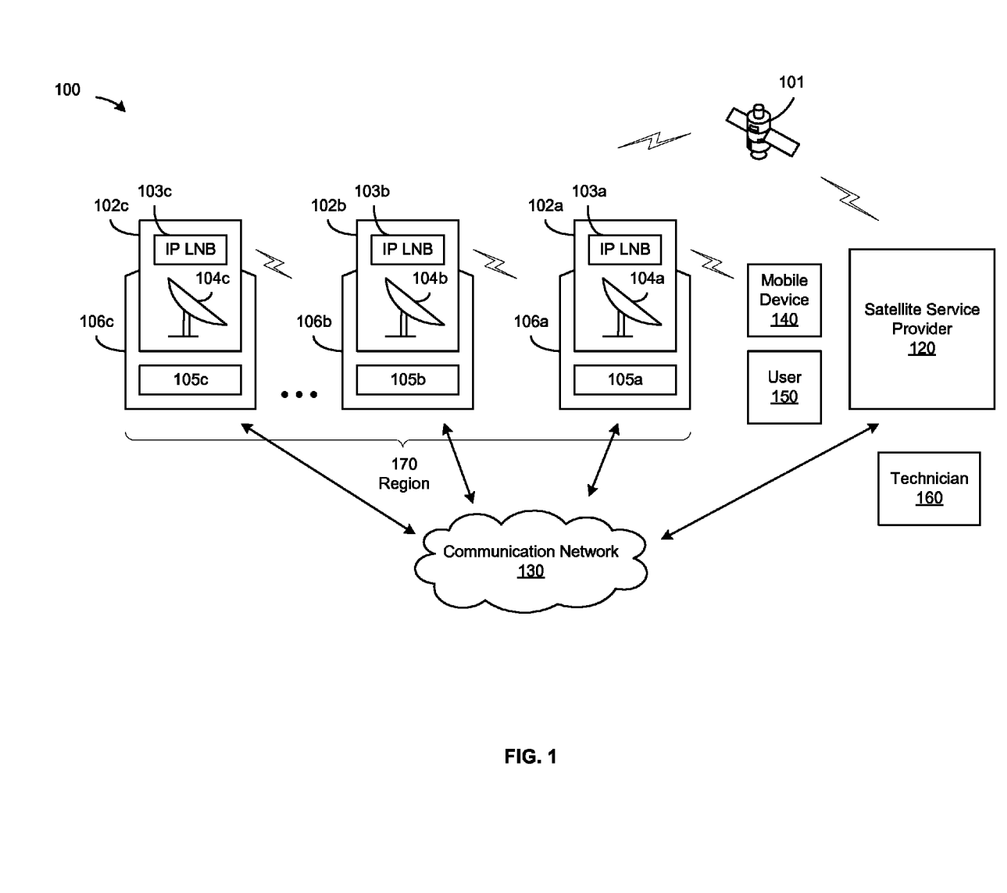
FIG. 1 is a block diagram illustrating an exemplary communication system, in accordance with an embodiment of the invention.

FIG. 1 is a block diagram illustrating an exemplary communication system, in accordance with an embodiment of the invention. Referring to FIG. 1, there is shown a communication system 100. The communication system 100 may comprise a satellite 101, a satellite service provider 120, a communication network 130 and a plurality of premises, of which the premises 106a-106c are illustrated. The premises 106a-106c may be, for example, houses, multi-dwelling units or offices. The premises 106a may comprise a satellite dish assembly 102a and a gateway 105a. The satellite dish assembly 102a may comprise an IP LNB assembly 103a and a dish 104a. The premises 106b may comprise a satellite dish assembly 102b and a gateway 105b. The satellite dish assembly 102b may comprise an IP LNB assembly 103b and a dish 104b. The premises 106c may comprise a satellite dish assembly 102c and a gateway 105c. The satellite dish assembly 102c may comprise an IP LNB assembly 103c and a dish 104c.

The satellite service provider 120 may comprise suitable logic, circuitry, interfaces and/or code that may be operable to communicate in various satellite bands. The satellite service provider 120 may provide satellite television services to the plurality of premises 106a-106c via the satellite 101. The satellite service provider 120 may also be referred to as a satellite headend.

A satellite dish assembly such as the satellite dish assembly 102a may receive satellite signals from the satellite 101 via the dish 104a. The IP LNB assembly 103a in the satellite dish assembly 102a may process the received satellite signals and communicate the processed signals or data to the gateway 105a. The IP LNB assembly 103a may communicate the processed signals to the gateway 105a via, for example, one or more cables such as coaxial cables.

An IP LNB assembly such as the IP LNB assembly 103a may comprise suitable logic, circuitry, interfaces and/or code that may be operable to process the received satellite signals. The IP LNB assembly 103a may be operable to downconvert the received satellite signals, channelize the downconverted signals, demodulate the channelized signals and convert the demodulated or recovered signals to digitized packets such as Internet protocol (IP) packets.

In an exemplary embodiment of the invention, the IP LNB assembly 103a may comprise one or more sensors which may be integrated within or coupled to the IP LNB assembly 103a. The IP LNB assembly 103a may comprise a wireless interface module which may provide, for example, cellular, femtocell, picocell, WiMax and/or WiFi interfaces. For example, the IP LNB assembly 103a may provide connectivity with a mobile device such as the mobile device 140 via the wireless interface module. The IP LNB assembly 103a may interconnect, via the wireless interface module, with other IP LNB assemblies such as the IP LNB assemblies 103b-103c within the proximity of a neighborhood to establish a mesh network in a region such as the region 170. The IP LNB assembly 103a may comprise one or more antennas which may be integrated within or coupled to the wireless interface module. A plurality of antenna elements may be arranged as an antenna array. The IP LNB assembly 103a may comprise a wired interface module which may provide connectivity with the gateway 105a. The IP LNB assembly 103a may comprise a routing module. The routing module may be operable to route bandwidth among the satellite 101, the wireless interface module and the wired interface module. For example, the routing module may route satellite video content to destinations accessed through the wireless interface module and/or the wired interface module. The IP LNB assembly 103a may also comprise, for example, a global navigation satellite system (GNSS) module. For example, the GNSS module may comprise a global positioning system (GPS) unit.

A gateway such as the gateway 105a may comprise suitable logic, circuitry, interfaces and/or code that may be operable to process satellite data received from the IP LNB assembly 103a and output the data to an end-user device such as a television in the premises 106a. The gateway 105a may be operable to perform reception, processing and/or transmission of signals or data. The gateway 105a may communicate signals or data to and/or from among the IP LNB assembly 103a, the communication network 130 and/or a local area network (LAN) in the premises 106a. The gateway 105a may also be referred to as a receiver, a set-top box (STB) or a cable modem.

The communication network 130 may comprise suitable logic, circuitry, interfaces, devices and/or code that may be operable to provide wide area network (WAN) services via various communication technologies such as, for example, DOCSIS, DSL, Carrier Ethernet, ATM, Frame Relay, ISDN, x.25 and/or other suitable WAN technology. For example, the communication network 130 may comprise an Internet network. In an exemplary embodiment of the invention, the communication network 130 may provide communication services to the premises 106a-106c and/or the satellite service provider 120.

In operation, the IP LNB assembly 103a, which is within the satellite dish assembly 102a, may be operable to determine a location setting, an alignment setting and/or a received signal strength of the satellite dish assembly 102a for a baseline. The IP LNB assembly 103a may be operable to monitor, periodically or aperiodically, the location setting for setting change and/or the alignment setting for setting change, based on the determined baseline settings. The IP LNB assembly 103a may be operable to monitor, periodically or aperiodically, the received signal strength for signal degradation, based on the determined received baseline signal strength. The baseline information and/or results of the monitoring of the baseline information may then be communicated by the IP LNB assembly 103a, via, for example, the communication network 130, to the satellite service provider 120.

The satellite service provider 120 may provide maintenance and/or service management for the satellite dish assembly 102a based on the communicated baseline information and/or the communicated monitored information. For example, the satellite service provider 120 may provide control to the IP LNB assembly 103a to self-adjust the satellite dish assembly 102a back to the baseline settings. The satellite service provider 120 may communicate or notify a user such as the user 150 and/or a technician such as the technician 160 for implementing adjustment services for the satellite dish assembly 102a. In this regard, the satellite service provider 120 may provide the user 150 or the technician 160 with adjustment information. Based on the location setting of the satellite dish assembly 102a along with other location settings associated with other satellite dish assemblies 102b, 102c in the region 170, the satellite service provider 120 may, for example, manage the amount of beam coverage, the amount of bandwidth and/or other services for the region 170. Based on the monitored received signal strength information and/or environmental conditions received from the IP LNB assembly 103a, the satellite service provider 120 may manage a power level of the satellite 101, for example.

Figure 2:
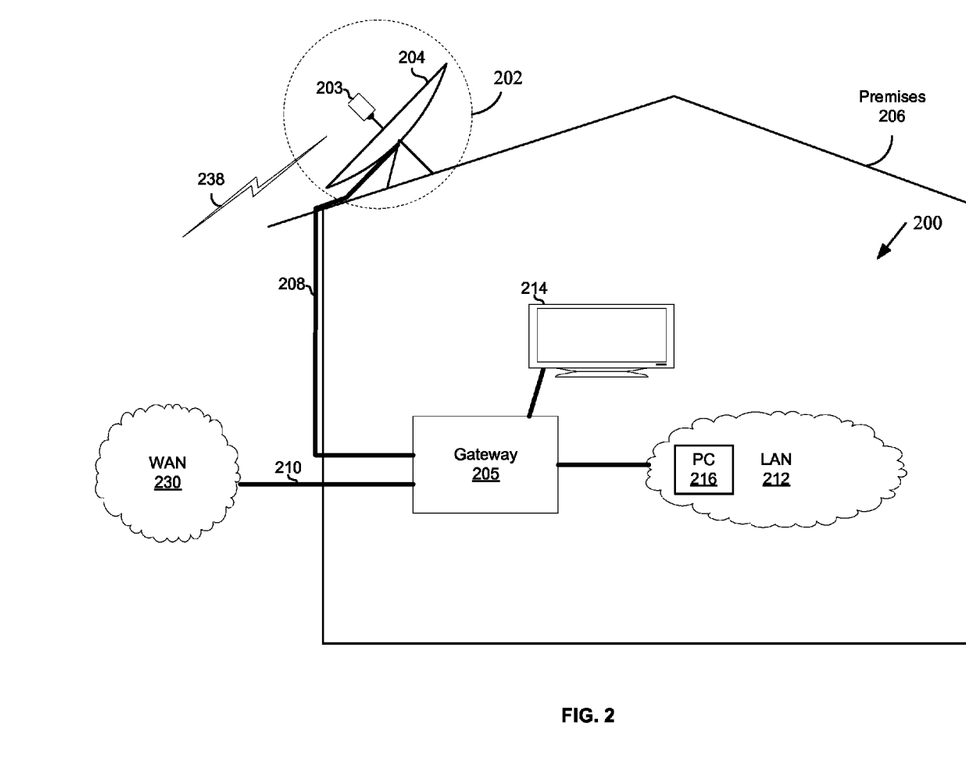
FIG. 2 is a block diagram illustrating an exemplary satellite television system, in accordance with an embodiment of the invention.

FIG. 2 is a block diagram illustrating an exemplary satellite television system, in accordance with an embodiment of the invention. Referring to FIG. 2, there is shown an in-premises network 200 that is located within the premises 206, a satellite dish assembly 202 and a wide area network (WAN) 230. The satellite dish assembly 202 may comprise an IP LNB assembly 203 and a dish 204. There is also shown a network link 208 connecting the satellite dish assembly 202 and the in-premises network 200, a network link 210 connecting the in-premises network 200 and the WAN 230. The exemplary in-premises network 200 may comprise a gateway 205, a television 214 and a local area network (LAN) 212.

The premises 206 may be substantially the same as the premises 106a described with respect to FIG. 1, for example. The satellite dish assembly 202 may be substantially the same as the satellite dish assembly 102a described with respect to FIG. 1, for example. The dish 204 may be substantially the same as the dish 104a described with respect to FIG. 1, for example. The IP LNB assembly 203 may be substantially the same as the IP LNB assembly 103a described with respect to FIG. 1, for example. The gateway 205 may be substantially the same as the gateway 105a described with respect to FIG. 1, for example. The WAN 230 may be substantially the same as the communication network 130 described with respect to FIG. 1, for example.

Each of the network links 208 and 210 may comprise one or more wired, wireless and/or optical links. The network link 208 may comprise, for example, a coaxial cable and/or a 60 GHz wireless link which carries physical layer symbols in accordance with, for example, multimedia over coax alliance (MoCA) or Ethernet standards. The network link 210 may comprise, for example, a coaxial cable or Cat 6 cable which carries physical layer symbols in accordance with, for example, DSL or Ethernet standards.

The television 214 may comprise suitable logic, circuitry, interfaces and/or code that may be operable to receive media and control data via one or more point-to-point media links (e.g., HDMI), process the received data and to recover audio and/or video, and present the audio and/or video to a user such as the user 150.

The LAN 212 may comprise suitable logic, circuitry, interfaces, devices and/or code that may be operable to provide network services within the premises 206. Devices such as, for example, a PC 216 in the LAN 212 may communicate utilizing, for example, MoCA, IEEE 802.11 and/or Ethernet protocols.

In operation, the dish 204 may receive one or more satellite television signals, each of which may be comprised of one or more channels. The signals may be processed by the IP LNB assembly 203 to recover one or more of the channels carried in the received signals. The processing of the received satellite signals by the IP LNB assembly 203 may comprise downconverting the received satellite signals, channelizing the downconverted signals, demodulating the channelized signals and converting the demodulated or recovered signals to digitized packets such as Internet protocol (IP) packets. The processed signals or data may be communicated from the IP LNB assembly 203 to the gateway 205 via the network link 208. The gateway 205 may then process the received signals or data for distribution to the television 214 and/or to an end-user device such as the PC 216 in the LAN 212. The gateway 205 may also be operable to route the received signals or data to the WAN 230 via the network link 210. The IP LNB assembly 203 may also communicate processed signals or data to a mobile device such as the mobile device 140 or an IP LNB assembly such as the IP LNB assembly 103b within the proximity of a neighborhood, via a wireless link such as the wireless link 238.

The IP LNB assembly 203 may be operable to determine or establish, for a baseline, a location setting, an alignment setting and/or a received signal strength of the satellite dish assembly 202. The IP LNB assembly 203 may be operable to monitor (periodically or aperiodically) the location setting for setting change and/or the alignment setting for setting change, based on the determined baseline settings. The IP LNB assembly 203 may be operable to monitor (periodically or aperiodically) the received signal strength for signal degradation, based on the determined received baseline signal strength. The baseline information and/or results of the monitoring of the baseline information may then be communicated by the IP LNB assembly 203, via, for example, the network link 208, the gateway 205, the network link 210 and the WAN 230, to the satellite service provider 120, for example.

Based on the monitored alignment information, the IP LNB assembly 203 may be operable to adjust the alignment of the satellite dish assembly 202 autonomously. The adjustment may also be controlled from the satellite service provider 120 via, for example, the WAN 230, the network link 210, the gateway 205 and the network link 208. Based on the location setting or information of the IP LNB assembly 203, the satellite service provider 120 may communicate or transmit one or more targeted advertisements to the premises 206, for example. The targeted advertisement may be delivered, for example, utilizing a special channel via the WAN 230, the network link 210 and the gateway 205.

Figure 3:
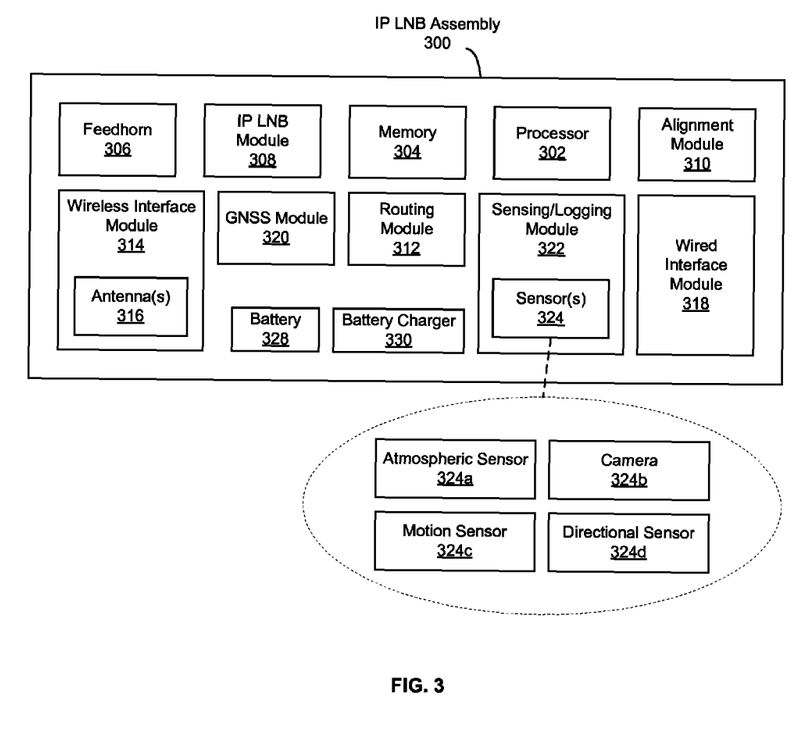
FIG. 3 is a block diagram illustrating an exemplary Internet protocol LNB assembly, in accordance with an embodiment of the invention.

FIG. 3 is a block diagram illustrating an exemplary Internet protocol LNB assembly, in accordance with an embodiment of the invention. Referring to FIG. 3, there is shown an IP LNB assembly 300. The IP LNB assembly 300 may be substantially the same as the IP LNB assembly 203 described with respect to FIG. 2 and the IP LNB assembly 103a described with respect to FIG. 1, for example. The IP LNB assembly 300 may comprise a processor 302, a memory 304, a feedhorn 306, an IP LNB module 308, an alignment module 310, a routing module 312, a wireless interface module 314, a wired interface module 318, a GNSS module 320, a sensing/logging module 322, a backup battery 328 and a battery charger 330. The wireless interface module 314 may comprise one or more antennas 316. The sensing/logging module 322 may comprise one or more sensors 324.

The processor 302 may comprise suitable logic, circuitry, interfaces and/or code that may be operable to manage and/or control operations of various components and/or modules in the IP LNB assembly 300. The processor 302 may utilize an operating system that enables the execution of various applications.

The memory 304 may comprise suitable logic, circuitry, interfaces and/or code that may be operable to store information such as executable instructions and/or data that may be utilized by the processor 302 and/or other modules or components in the IP LNB assembly 300. The memory 304 may comprise RAM, ROM, low latency nonvolatile memory such as flash memory and/or other suitable electronic data storage.

The feedhorn 306 may comprise suitable logic, circuitry, interfaces and/or code that may be operable to gather satellite signals which may be received from a satellite such as the satellite 101 via a satellite dish such as the dish 204. The feedhorn 306 may direct the gathered satellite signals to the IP LNB module 308 for processing.

The IP LNB module 308 may comprise suitable logic, circuitry, interfaces and/or code that may be operable to process the satellite signals gathered by the feedhorn 306. The IP LNB module 308 may be operable to downconvert the received satellite signals, channelize the downconverted signals, demodulate the channelized signals and convert the demodulated or recovered signals to digitized data such as IP packets. The IP LNB module 308 may process the signals employing one or more full-spectrum capture (FSC) receivers in the IP LNB module 308. In an exemplary embodiment of the invention, the IP LNB module 308 may be operable to detect the signal strength received from a satellite such as the satellite 101. The IP LNB module 308 may determine the received signal strength based on a received signal strength indication (RSSI). The RSSI is a measurement of the power or signal strength present in a received radio signal at, for example, the IP LNB module 308 from the satellite 101.

The alignment module 310 may comprise suitable logic, circuitry, interfaces and/or code that may be operable to perform alignment functions for the IP LNB assembly 300 and/or the dish 204. In an exemplary embodiment of the invention, the alignment module 310 may comprise MEMS or piezo electric devices.

The routing module 312 may comprise suitable logic, circuitry, interfaces and/or code that may be operable to selectively route data and/or signals among the IP LNB module 308, the wireless interface module 314 and the wired interface module 318. The routing may be based on IP addresses, TCP/UDP port numbers, packet identifiers (PIDs), stream identifiers and/or any other suitable field or information. For example, the routing module 312 may route satellite video content to end-user devices accessed through the wireless interface module 318 and/or the wired interface module 318.

The wireless interface module 314 may comprise suitable logic, circuitry, interfaces and/or code that may be operable to establish one or more wireless connections, such as the wireless link 238, with one or more mobile devices such as the mobile device 140. The connections may utilize any suitable wireless protocol(s) such as, for example, cellular, femtocell, picocell, WiMax and/or WiFi. In an exemplary embodiment of the invention, the wireless interface module 314 may be implemented as a small-cell basestation such as, for example, a femtocell or a picocell basestation. The wireless interface module 314 may comprise one or more antennas 316. The antenna(s) 316 may be integrated within or coupled to the IP LNB assembly 300. The antenna(s) 316 may be arranged as an antenna array.

The wired interface module 318 may comprise suitable logic, circuitry, interfaces and/or code that may be operable to communicate data via one or more cables such as the network link 208 with a gateway such as the gateway 205. For example, the wired interface module 318 may be operable to output, via the cable(s), the signals or data received from the IP LNB module 308 to the gateway 205. The wired interface module 318 may be able to communicate over the cable(s) utilizing Ethernet, MoCA and/or any other suitable protocol(s).

The GNSS module 320 may comprise suitable logic, circuitry, interfaces and/or code that may be operable to detect and receive GNSS signals or data from one or more GNSS satellites. The GNSS module 320 may be operable to generate location setting information and/or time information associated with the IP LNB assembly 300.

The sensing/logging module 322 may comprise suitable logic, circuitry, interfaces and/or code that may be operable to collect information received from one or more sensors 324. The sensor(s) 324 may be integrated within or coupled to the IP LNB assembly 300. The sensing/logging module 322 may store the collected information received from the sensor(s) 324. In an exemplary embodiment of the invention, the sensor(s) 324 may comprise, for example, an atmospheric sensor 324a, a camera 324b, a motion sensor 324c and/or a directional sensor 324d. The atmospheric sensor 324a may provide weather related information such as, for example, temperature, humidity, barometric pressure, wind speed and/or precipitation. The camera 324b may also be referred to as an optical CMOS sensor, for example. The directional sensor 324d may comprise, for example, a 3D axis compass and/or a 3D axis gyroscope. The directional sensor 324d may provide alignment setting information for an associated satellite dish assembly such as the satellite dish assembly 202, for example.

The backup battery 328 may be operable to provide backup power to the IP LNB assembly 300 in instances when the IP LNB assembly 300 loses AC power. The battery charger 330 may comprise circuitry that may be operable to keep the backup battery 328 charged. In an exemplary embodiment of the invention, at least a portion of an associated dish such as the dish 204 may comprise solar panels that may be utilized by the battery charger 330 to charge the backup battery 328 when there is solar energy available.

In operation, in order to establish a baseline configuration for the satellite dish assembly 202, the processor 302 may be operable to determine the location setting of the satellite dish assembly 202 via the GNSS module 320. The processor 302 may be operable to determine the alignment setting of the satellite dish assembly 202 via the directional sensor 324d, for example. The processor 302 may be operable to determine the received signal strength based on, for example, the received signal strength indication (RSSI) which may be communicated from the IP LNB module 308. The baseline configuration may be established at the time of installation of the satellite dish assembly 202, for example. The processor 302 may be operable to monitor, periodically or aperiodically, the baseline configuration. For example, the location setting and/or the alignment setting may be monitored for setting changes. The received signal strength may be monitored for signal degradation. The baseline information and/or the monitoring results may then be communicated to a satellite service provider such as the service provider 120, via, for example, the wired interface module 318. Accordingly, the satellite service provider 120 may provide maintenance service and/or service management based on the communicated baseline information and/or the communicated monitoring results.

Figure 4:
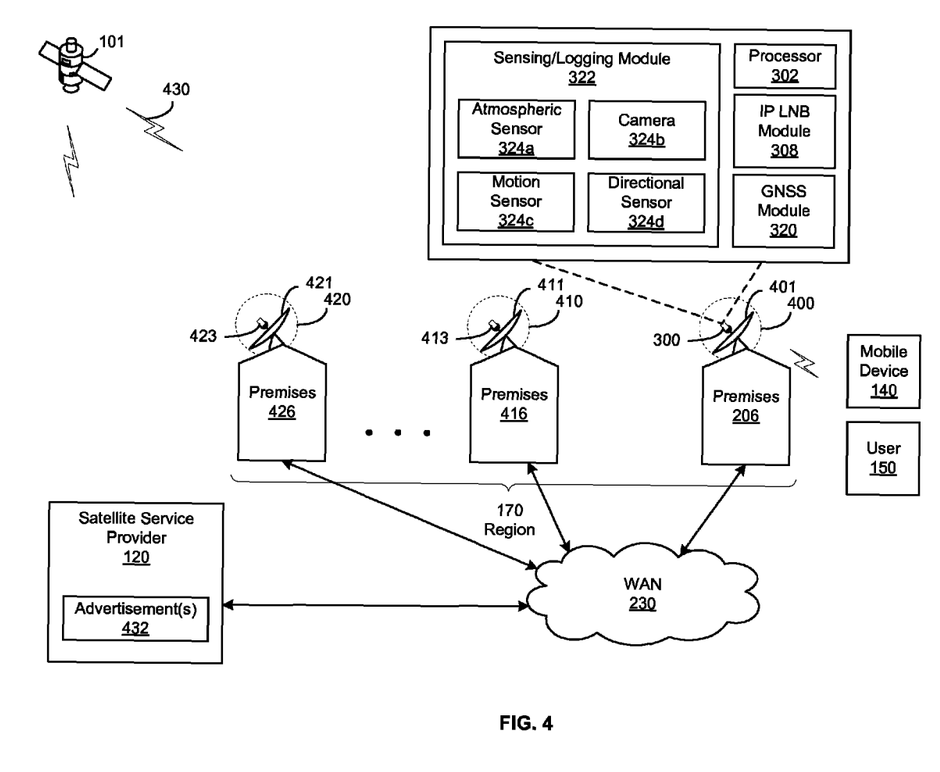
FIG. 4 is a diagram illustrating exemplary scenarios of service management for an Internet protocol LNB assembly, in accordance with an embodiment of the invention.

FIG. 4 is a block diagram illustrating exemplary scenarios of service management for an Internet protocol LNB assembly, in accordance with an embodiment of the invention. Referring to FIG. 4, there is shown the premises 206, the WAN 203, a satellite dish assembly 400 collocated on the premises 206, the satellite 101 and the satellite service provider 120. The premises 206 and the WAN 230 may be as described with respect to FIG. 2, for example. The satellite 101 and the satellite service provider 120 may be as described with respect to FIG. 1, for example. The satellite dish assembly 400 may be substantially the same as the satellite dish assembly 202 described with respect to FIG. 2, for example. In this regard, the satellite dish assembly 400 may comprise the IP LNB assembly 300 and a dish 401. The IP LNB assembly 300 may be as described with respect to FIG. 3, for example. The dish 401 may be substantially the same as the dish 204, which is described with respect to FIG. 2, for example.

There is also shown, in FIG. 4, a plurality of other premises, such as the premises 416, 426 in a region such as the region 170. The premises 416 may comprise a satellite dish assembly 410. The satellite dish assembly 410 may comprise an IP LNB assembly 413 and a dish 411. The premises 426 may comprise a satellite dish assembly 420. The satellite dish assembly 420 may comprise an IP LNB assembly 423 and a dish 421.

In an exemplary operation, based on the determined location setting of the satellite dish assembly 400 along with other location settings associated with other satellite dish assemblies 410, 420 in the region 170, the satellite service provider 120 may determine an amount of beam coverage and/or an amount of bandwidth that may be required for the region 170. The location setting may be determined via the GNSS module 320 in the IP LNB assembly 300, for example. In this regard, more or less beams 430 may be pointed at or concentrated on the region 170 based on the number of IP LNB assemblies 300, 413, 423 located in the region 170. In instances where the IP LNB assemblies 300, 413, 423 may have devices such as mobile devices communicatively coupled to them, then the satellite service provider 120 may periodically or aperiodically determine whether extra bandwidth is required to maintain some minimum quality of services (QoS) within the region 170. In this regard, the satellite service provider 120 may allocate, deallocate or reallocate bandwidth for the region 170 in order to maintain a certain level of QoS. For example, a mobile device such as the mobile device 140 may be coupled to the IP LNB assembly 300. In such an instance, extra bandwidth may be required for the IP LNB module 308 in the IP LNB assembly 300, for example. In this regard, the processor 302 in the IP LNB assembly 300 may then be operable to manage the extra bandwidth and handle QoS for a plurality of data streams among the mobile device 140 and, other end-user devices associated with the IP LNB assembly 300 in the premises 206.

Based on the determined location setting of the satellite dish assembly 400, the satellite service provider 120 may communicate or provide one or more targeted advertisements 432 to a user such as the user 150 associated with the satellite dish assembly 400. The satellite targeted advertisement(s) 432 may be provided using a special channel which may be delivered via the WAN 230 to the premises 206, for example. In this regard, the satellite service provider 120 may target advertisement(s) 432 based on demographics.

Based on the monitoring of the received signal strength (e.g., via the IP LNB module 308 in the IP LNB assembly 300) and/or environmental conditions, the satellite service provider 120 may dynamically and/or adaptively adjust a power level of the associated satellite 101. For example, the amount of the power level of a transponder in the satellite 101 may be controlled, increased or decreased, based on received signal strength measurements and/or environmental conditions such as current weather conditions. The received signal strength measurement may comprise, for example, the RSSI. The current weather conditions may be determined from the atmospheric sensor 324a in the IP LNB assembly 300, for example. Poor weather conditions in the region 170 may be anticipated based on climate monitoring and prediction, and the power level of the transponder may be adjusted ahead of anticipated degradation in the satellite link budget due to the ensuing inclement weather patterns.

Figure 5:
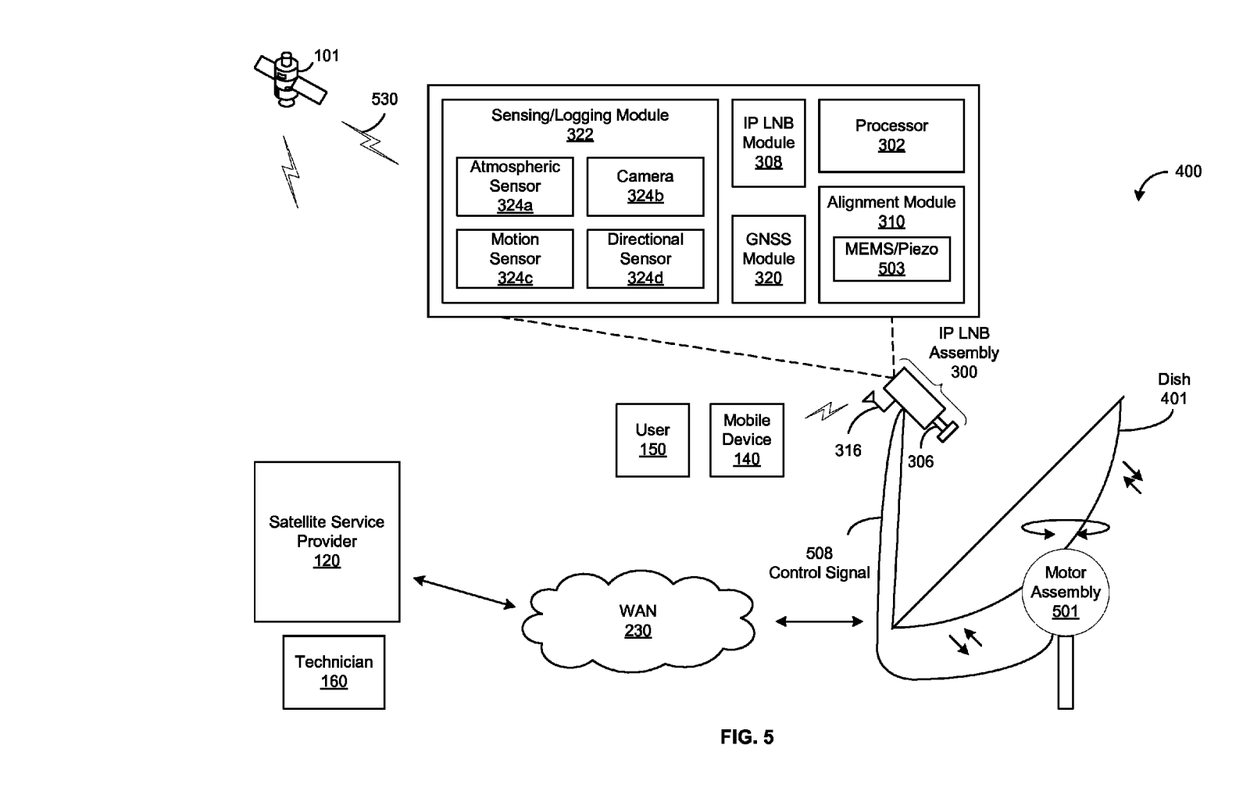
FIG. 5 is a diagram illustrating exemplary scenarios of maintenance for an Internet protocol LNB assembly, in accordance with an embodiment of the invention.

FIG. 5 is a block diagram illustrating exemplary scenarios of maintenance for an Internet protocol LNB assembly, in accordance with an embodiment of the invention. Referring to FIG. 5, there is shown the satellite dish assembly 400. The satellite dish assembly 400 may be as described with respect to FIG. 4, for example. The satellite dish assembly 400 may comprise the dish 401, the IP LNB assembly 300 and a motor assembly 501. The motor assembly 501 may comprise, for example, an elevation motor and/or an azimuth motor. The motor assembly 501 may be operable to adjust the dish 401 for alignment. The IP LNB assembly 300 may be as described with respect to FIG. 3, for example. In this regard, the alignment module 310 in the IP LNB assembly 300 may comprise MEMS or piezo electric devices 503.

There is also shown, in FIG. 5, the satellite service provider 120, the satellite 101 and the WAN 230. The satellite service provider 120 and the satellite 101 may be as described with respect to FIG. 1, for example. The WAN 230 may be as described with respect to FIG. 2, for example.

In an exemplary operation, the processor 302 in the IP LNB assembly 300 may be operable to monitor the alignment setting and/or the received signal strength 530. Depending on the amount of change, appropriate adjustment may be made by the alignment module 310 in the IP LNB assembly 300. The alignment module 310 may be operable to adjust autonomously the satellite dish assembly 400 back to the baseline setting based on a result of the monitoring. The monitored setting may also be communicated to the satellite service provider 120 and reconfiguration of the satellite dish assembly 400 back to the baseline setting, by the alignment module 310, may be controlled from the satellite service provider 120. In such instances, for example, the MEMS or piezo electric devices 503 may be employed to electronically adjust the feedhorn 306. The MEMS or piezo electric devices 503 may be employed to adjust the elements in the antenna array 316. The alignment module 310 may also utilize the MEMS or piezo electric devices 503 to provide a control signal 508 to the motor assembly 501 for adjusting the dish 401. For example, adjustments may be made to the direction of the dish 401 to compensate for IP LNB assembly 300 drifts over time. The adjustment may be determined based on current alignment conditions as well as the RSSI information, for example. The dish 401 may be tilted in a particular direction, within a certain range, to achieve a particular receive pattern to provide the compensation.

The satellite service provider 120 may communicate, based on a result of the monitoring, adjustment information to a technician such as the technician 160 and/or to a user such as the user 150 for adjusting the satellite dish assembly 400 back to the baseline configuration. The adjustment information may be communicated to the user 150 via, for example, the WAN 230. For example, a storm may have blown branches that may have shifted the dish 401. The atmospheric sensor 324a in the IP LNB assembly 300 may be utilized to determine that there was a storm. Hence, if it is determined that the signal is degraded, then one possible recommendation would be to adjust the alignment of the dish 401. The directional sensor 324d may be utilized to provide alignment information to the satellite service provider 120. Accordingly, the satellite service provider 120 may specify an appropriate angle to which the dish 401 should be realigned in order to optimally receive signals. For example, historical data may be communicated to the satellite service provider 120 so that when certain conditions exist or are created, typical recommended steps to solve the problem or issues based on those conditions may be provided to the technician 160 and/or the user 150. In some instances, the adjustment information may comprise, for example, what may be wrong and what may need to be fixed before the technician 160 gets to the location of the satellite dish assembly 400. The adjustment information may also comprise, for example, what equipment and/or parts that may be needed to be brought to complete a service call.

While the user 150 or the technician 160 is adjusting the satellite dish assembly 400, the IP LNB assembly 300 may be operable to communicate information, which indicates current location setting and/or current alignment setting of the satellite dish assembly 400, to the user 150 or the technician 160. For example, while the user 150 is re-positioning or re-aligning the satellite dish assembly 400, a user interface may be provided via communication to a mobile device such as the mobile device 140. The user interface may, in real time, show the user 150, either graphically or by other means, the current position or alignment of the satellite dish assembly 400 and when the satellite dish assembly 400 has achieved proper positioning or alignment. In this regard, the other means may comprise, for example, means indicating overall system signal to noise ratio (SNR) or bit error rate.

Based on the determined location setting or information of the satellite dish assembly 400, the satellite service provider 120 may determine scheduling and/or routing direction for the technician 160. For example, a technician scheduling order may be determined based on expected repair time and location of the satellite dish assembly 400, similarity of types of repair to be handled by the technician 160, etc. Given the location information, routing directions may be provided to the technician 160 to maximize efficiency of travel and the number of service calls that may be performed in a given time period (e.g., in one morning, in one afternoon, in one shift, etc.).

Figure 6:
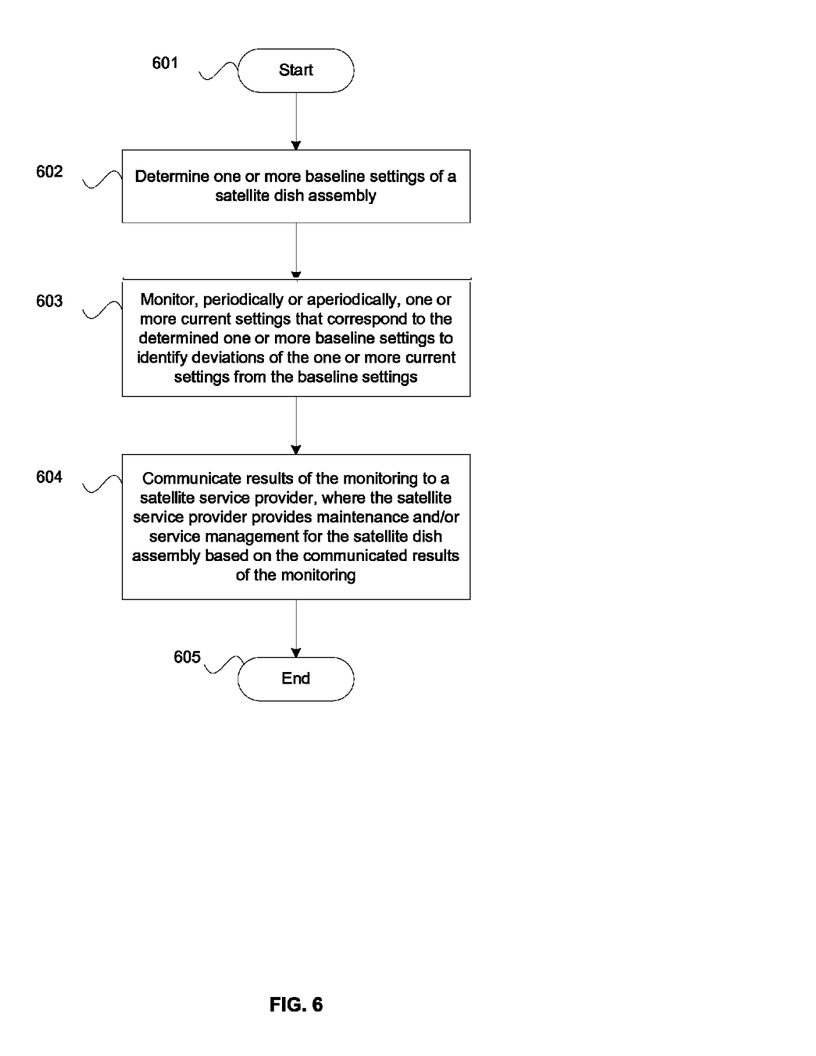
FIG. 6 is a flow chart illustrating exemplary steps for monitoring, management and maintenance of an Internet protocol LNB assembly, in accordance with an embodiment of the invention.

FIG. 6 is a flow chart illustrating exemplary steps for monitoring, management and maintenance of an Internet protocol LNB assembly, in accordance with an embodiment of the invention. Referring to FIG. 6, the exemplary steps start at step 601. In step 602, the processor 302 in the IP LNB assembly 300 may be operable to determine one or more baseline settings of the satellite dish assembly 400. In this regard, the one or more baseline settings may comprise, for example, a location setting, an alignment setting and/or a received signal strength 530. In step 603, the processor 302 may be operable to monitor, periodically or aperiodically, one or more current settings that may correspond to the determined one or more baseline settings to identify deviations of the one or more current settings from the baseline settings. In this regard, for example, the processor 302 may monitor the location setting for setting change, the alignment setting for setting change and/or the received signal strength for signal degradation. In step 604, the IP LNB assembly 300 may be operable to communicate the results of the monitoring to the satellite service provider 120. The satellite service provider 120 may provide maintenance and/or service management for the satellite dish assembly 400 based on the communicated results of the monitoring. The exemplary steps may proceed to the end step 605.

In various embodiments of the invention, an IP LNB assembly such as the IP LNB assembly 300 may be operational within a satellite dish assembly such as the satellite dish assembly 400. A processor 302 in the IP LNB assembly 300 may be operable to determine one or more baseline settings of the satellite dish assembly 400. The processor 302 may be operable to monitor, periodically or aperiodically, one or more current settings that may correspond to the determined one or more baseline settings to identify deviations of the one or more current settings from the baseline settings. The results of the monitoring may then be communicated by the IP LNB assembly 300 to a satellite service provider such as the satellite service provider 120. The satellite service provider 120 may then provide maintenance and/or service management for the satellite dish assembly 400 based on the communicated results of the monitoring. In this regard, the one or more baseline settings may comprise, for example, a location setting, an alignment setting and/or a received signal strength 530. The processor 302 may determine the location setting via a GNSS module 320 in the IP LNB assembly 300, and determine the alignment setting via a directional sensor 324d in the IP LNB assembly 300, for example. The processor 302 may determine the received signal strength based on a RSSI which may be communicated from an IP LNB module 308 in the IP LNB assembly 300.

An alignment module 310 in the IP LNB assembly 300 may be operable to adjust the satellite dish assembly 400 back to the baseline configuration based on the results of the monitoring. In such instances, the adjustment may be controlled from the satellite service provider 120 or autonomously by the alignment module 310. The satellite service provider 120 may communicate, based on the results of the monitoring, adjustment information to a technician such as the technician 160 and/or a user such as the user 150 for adjusting the satellite dish assembly 400 back to the baseline configuration. While the user 150 or the technician 160 is adjusting the satellite dish assembly, the IP LNB assembly 300 may be operable to communicate information, which indicates current location setting and/or current alignment setting of the satellite dish assembly 400, to the user 150 or the technician 160. In some instances, based on the determined location setting of the satellite dish assembly 400, the satellite service provider 120 may determine scheduling and/or routing direction for the technician 160.

Based on the determined location setting of the satellite dish assembly 400 along with other location settings associated with other satellite dish assemblies 410, 420 in a region such as the region 170, the satellite service provider 120 may determine an amount of beam coverage 430 and/or an amount of bandwidth that may be required for the region 170. Based on the determined location setting of the satellite dish assembly 400, the satellite service provider 120 may also communicate or provide one or more targeted advertisements 432 to a user such as the user 150. The satellite service provider 120 may dynamically and/or adaptively adjust a power level of an associated satellite such as the satellite 101 based on the monitoring of the received signal strength 530 and/or environmental conditions such as current weather conditions.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for monitoring, management and maintenance of an Internet protocol LNB.

Accordingly, aspects of the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method, comprising:
   in an Internet protocol low noise block downconverter (IP LNB) assembly that is within a satellite dish assembly:
      determining one or more baseline settings of said satellite dish assembly;
      monitoring, periodically or aperiodically, one or more current settings that correspond to said one or more baseline settings to identify deviations of said one or more current settings from said one or more baseline settings; and
      communicating, from said IP LNB assembly to a satellite service provider via a communication network that is separate from a satellite network used by said satellite dish assembly, results of said monitoring, wherein said satellite service provider provides maintenance and/or service management for said satellite dish assembly based on said communicated results.

2. The method according to claim 1, wherein said one or more baseline settings comprise a location setting, an alignment setting, and/or a received signal strength.

3. The method according to claim 2, comprising:
   determining said location setting via a global navigation satellite system (GNSS) module in said IP LNB assembly; and
   determining said alignment setting via a directional sensor in said IP LNB assembly.

4. The method according to claim 2, comprising determining said received signal strength based on a received signal strength indication (RSSI).

5. The method according to claim 1, comprising adjusting said satellite dish assembly back to said baseline based on said results of said monitoring, wherein said adjustment is controlled from said satellite service provider or autonomously by said IP LNB assembly.

6. The method according to claim 2, wherein said satellite service provider communicates, based on said results of said monitoring, adjustment information to a technician and/or a user for adjusting said satellite dish assembly back to said baseline.

7. The method according to claim 6, comprising, while said user or said technician is adjusting said satellite dish assembly, communicating information which indicates a current location setting and/or a current alignment setting of said satellite dish assembly to said user or said technician.

8. The method according to claim 6, wherein, based on said determined location setting of said satellite dish assembly, said satellite service provider determines scheduling and/or routing direction for said technician.

9. The method according to claim 2, wherein, based on said determined location setting of said satellite dish assembly along with other location settings associated with other satellite dish assemblies in a region, said satellite service provider determines an amount of beam coverage and/or an amount of bandwidth that are required for said region.

10. The method according to claim 2, wherein said satellite service provider communicates one or more targeted advertisements to a user based on said determined location setting of said satellite dish assembly.

11. The method according to claim 2, wherein said satellite service provider dynamically and/or adaptively adjusts a power level of an associated satellite based on said monitoring of said received signal strength and/or environmental conditions.

12. A system, comprising:
   an Internet protocol low noise block downconverter (IP LNB) assembly that is operational within a satellite dish assembly, said IP LNB assembly being operable to:
      determine one or more baseline settings of said satellite dish assembly;
      monitor, periodically or aperiodically, one or more current settings that correspond to said one or more baseline settings to identify deviations of said one or more current settings from said one or more baseline settings; and
      communicate, from said IP LNB assembly to a satellite service provider via a communication network that is separate from a satellite network used by said satellite dish assembly, results of said monitoring, wherein said satellite service provider provides maintenance and/or service management for said satellite dish assembly based on said communicated results.

13. The system according to claim 12, wherein said one or more baseline settings comprise a location setting, an alignment setting, and/or a received signal strength.

14. The system according to claim 12, wherein said IP LNB assembly is operable to adjust said satellite dish assembly back to said baseline based on said results of said monitoring, and said adjustment is controlled from said satellite service provider or autonomously by said IP LNB assembly.

15. The system according to claim 13, wherein said satellite service provider communicates, based on said results of said monitoring, adjustment information to a technician and/or a user for adjusting said satellite dish assembly back to said baseline.

16. The system according to claim 15, wherein, while said user or said technician is adjusting said satellite dish assembly, said IP LNB assembly is operable to communicate information which indicates a current location setting and/or a current alignment setting of said satellite dish assembly to said user or said technician.

17. The system according to claim 15, wherein, based on said determined location setting of said satellite dish assembly, said satellite service provider determines scheduling and/or routing direction for said technician.

18. The system according to claim 13, wherein, based on said determined location setting of said satellite dish assembly along with other location settings associated with other satellite dish assemblies in a region, said satellite service provider determines an amount of beam coverage and/or an amount of bandwidth that are required for said region.

19. The system according to claim 13, wherein said satellite service provider dynamically and/or adaptively adjusts a power level of an associated satellite based on said monitoring of said received signal strength and/or environmental conditions.

20. A system, comprising:
one or more processors for use in an Internet protocol low noise block downconverter (IP LNB) assembly that is operational within a satellite dish assembly, said one or more processors being operable to:
determine one or more baseline settings of said satellite dish assembly;
monitor, periodically or aperiodically, one or more current settings that correspond to said one or more baseline settings to identify deviations of said one or more current settings from said one or more baseline settings; and
communicate, from said IP LNB assembly to a satellite service provider via a communication network that is separate from a satellite network used by said satellite dish assembly, results of said monitoring, wherein said satellite service provider provides maintenance and/or service management for said satellite dish assembly based on said communicated results.

* * * * *